US012730005B2

(12) United States Patent
Chen et al.

(10) Patent No.: US 12,730,005 B2
(45) Date of Patent: Sep. 8, 2026

(54) METHOD AND DEVICE FOR DUST IDENTIFICATION UTILIZING MULTIMODAL NEURAL NETWORK, AND STORAGE DEVICE

(71) Applicant: Lanzhou University, Lanzhou (CN)

(72) Inventors: Siyu Chen, Lanzhou (CN); Jiaqi He, Lanzhou (CN); Shikang Du, Lanzhou (CN); Linchang An, Lanzhou (CN); Yunqian Guo, Lanzhou (CN); Junyan Chen, Lanzhou (CN)

(73) Assignee: Lanzhou University, Lanzhou (CN)

( * ) Notice: Subject to any disclaimer, the term of this patent is extended or adjusted under 35 U.S.C. 154(b) by 261 days.

(21) Appl. No.: 18/583,882

(22) Filed: Feb. 22, 2024

(65) Prior Publication Data

US 2024/0402013 A1 Dec. 5, 2024

(30) Foreign Application Priority Data

May 31, 2023 (CN) ......................... 202310630477.7

(51) Int. Cl.

| | |
|---|---|
| ***G01J 3/28*** | (2006.01) |
| ***G06V 10/80*** | (2022.01) |
| ***G06V 10/82*** | (2022.01) |

(52) U.S. Cl.

CPC .......... *G01J 3/2823* (2013.01); *G06V 10/806* (2022.01); *G06V 10/82* (2022.01); *G01J 2003/2826* (2013.01)

(58) Field of Classification Search

CPC ............ G01J 3/2823; G01J 2003/2826; G06V 10/806; G06V 10/82; G06V 10/764; G06V 20/13; G06V 10/803; G06V 10/809; G06V 20/10; G06N 3/0455; G06N 3/0464; G06N 3/08

USPC .......................................................... 356/456

See application file for complete search history.

(56) References Cited

U.S. PATENT DOCUMENTS

| | | | | |
|---|---|---|---|---|
| 11,451,694 | B1 | 9/2022 | Decrop et al. | |
| 11,816,987 | B2 | 11/2023 | Dantrey et al. | |
| 11,852,598 | B2 | 12/2023 | Aguiar | |
| 2022/0026917 | A1* | 1/2022 | Beijbom | G05D 1/0219 |
| 2025/0130153 | A1* | 4/2025 | Qian | G06N 20/00 |

FOREIGN PATENT DOCUMENTS

| | | | | |
|---|---|---|---|---|
| CN | 104635242 | A * | 5/2015 | G01W 1/00 |
| CN | 110874594 | A * | 3/2020 | G06F 18/214 |
| CN | 113064221 | A * | 7/2021 | G05D 1/0808 |
| CN | 113449743 | A * | 9/2021 | G06N 3/045 |
| CN | 114118270 | A * | 3/2022 | G06F 18/214 |
| CN | 119537967 | A * | 2/2025 | G06Q 50/06 |

* cited by examiner

*Primary Examiner* — Md M Rahman

(57) ABSTRACT

A method for dust identification includes following steps: collecting multi-source data related to dust; preprocessing the multi-source data to obtain processed data; constructing a training set for a dust identification model using the processed data; constructing the dust identification model, where the dust identification model includes a backbone network, an output network, and a fusion network; training the dust identification model based on the training set to obtain a final model; and identifying dust based on the final model. The dust identification method significantly improves a speed and accuracy of dust identification, and also partially improves continuity of the dust identification.

8 Claims, 2 Drawing Sheets

METHOD AND DEVICE FOR DUST IDENTIFICATION UTILIZING MULTIMODAL NEURAL NETWORK, AND STORAGE DEVICE

CROSS-REFERENCE TO RELATED APPLICATIONS

This application claims priority to Chinese Patent Application No. 202310630477.7 with a filing date of May 31, 2023. The content of the aforementioned application, including any intervening amendments thereto, is incorporated herein by reference.

TECHNICAL FIELD

The current disclosure relates to the field of dust prediction, specifically focusing on a method and device for dust identification utilizing a multimodal neural network. Additionally, this disclosure extends to the description of a corresponding storage device.

BACKGROUND

The identification and detection of sudden dust weather events have consistently posed a significant bottleneck in the realm of weather forecasting.

Historically, the identification and detection of dust weather relied predominantly on satellite remote sensing and diverse dust detection indices. Specifically, dust-related information was derived using a threshold method based on distinct spectral characteristics of dust particles under multi-channel conditions. In this method, the satellite remote sensing data's pixel value is compared to a predefined threshold; if the pixel value surpasses this threshold, the occurrence of dust weather is affirmed. However, practical applications of this method introduce numerous uncertainties, particularly in threshold determination. Different thresholds may arise from satellite images captured at varying times, and disparate surface features may share a common threshold. Consequently, the practical utility of this method is compromised, as its accuracy falls short of meeting practical requirements.

SUMMARY OF PRESENT INVENTION

To enhance the precision of dust identification, this disclosure systematically incorporates a range of dust-related factors, encompassing satellite data, inversion data from a moderate-resolution imaging spectroradiometer (MODIS), ground observation data, among others. The proposed method advances dust identification through the utilization of a multimodal neural network. The procedural steps of this method are detailed as follows:

S1: collecting multi-source data related to dust;

S2: preprocessing multi-source data to obtain processed data;

S3: constructing a training set for a dust identification model using processed data;

S4: constructing the dust identification model, where the dust identification model includes a backbone network, an output network, and a fusion network;

S5: training the dust identification model based on the training set to obtain a final model; and

S6: completing dust identification based on the final model.

A storage device is provided, where the storage device stores an instruction and data for implementing the dust identification method based on a multimodal neural network.

Dust identification device utilizing a multimodal neural network includes a processor and a storage device, where the processor loads and executes an instruction and data in the storage device to implement the dust identification method based on a multimodal neural network.

The present disclosure has following beneficial effects: Compared with an existing traditional method, the present disclosure significantly improves a speed and accuracy of dust identification, and also partially improves continuity of the dust identification.

DETAILED DESCRIPTION OF THE EMBODIMENTS

In order to make the objectives, technical solutions, and advantages of the present disclosure clearer, the implementations of the present disclosure will be further described in detail in conjunction with the accompanying drawings.

Figure 1:
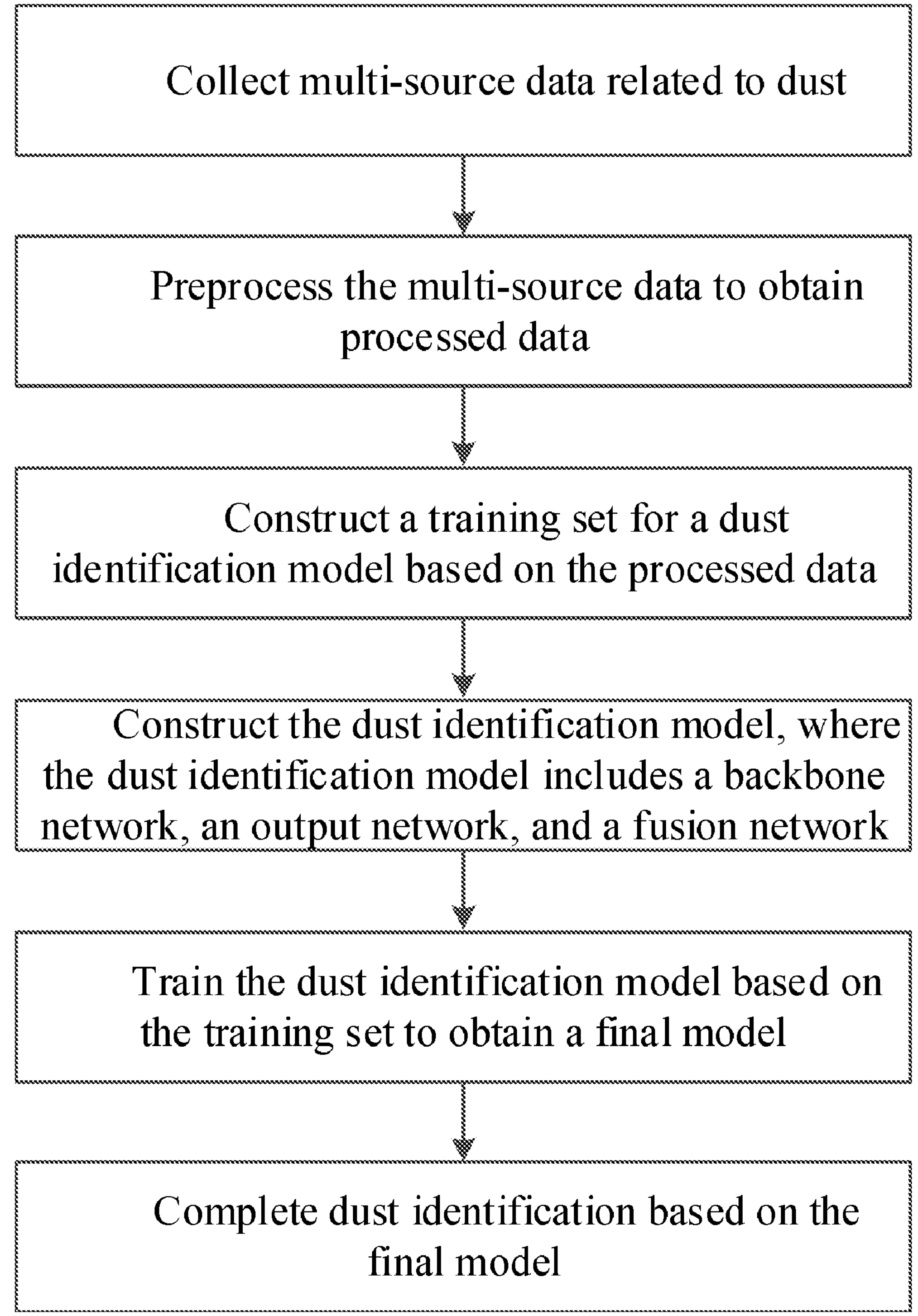
FIG. 1 is a flowchart of a method according to the present disclosure.

FIG. 1 is a flowchart of a method according to the present disclosure.

The present disclosure provides a dust identification method based on a multimodal neural network, including following steps.

In step S1, collect the multi-source data related to dust.

Components of multi-source data: inversion data of an imaging spectrometer, data of a ground meteorological observation station, and image data of a dust event.

As an embodiment, the present disclosure collects inversion data of a MODIS, data of a ground meteorological observation station, CMA land data assimilation system (CLDAS) data from the China Meteorological Administration, and ERA5 data from the European Centre for Medium-Range Weather Forecasts in a to-be-identified region in 2018 to 2022. The present disclosure also collects image data of dust events in study regions of 14 channels of the advanced geostationary radiation imager (AGRI) of the FY-4 satellite in 2018 to 2022.

In step S2, the multi-source data to obtain processed data is preprocessed.

The preprocessing in the step S2 specifically includes: fusing the multi-source data to obtain fused data; and combining a normalized difference dust index and a thermal infrared dust index for the image data of the dust event to obtain a comprehensive dust distinguish index.

As an embodiment, based on a designated identification grid, the present disclosure fuses the collected image data of the FY-4 satellite, inversion data of the MODIS, data of the ground meteorological observation station, CLDAS data from the China Meteorological Administration, and ERA5 data from the European Centre for Medium-Range Weather Forecasts.

In addition, the present disclosure uses a threshold method to jointly calculate MODIS data within a corresponding grid point based on the normalized difference dust index and the thermal infrared dust index to obtain the comprehensive dust distinguish index.

In step S3, a training set for a dust identification model is constructed based on the processed data.

A process of constructing the training set of the dust identification model in the step S3 is as follows:

performing spectral analysis on a corresponding channel of the image data of the dust event to obtain a channel suitable for distinguishing dust; and in the channel suitable for distinguishing the dust, manually marking corresponding image data of the dust event, distinguishing between a dust region and a non-dust region, and completing construction of the training set.

As an embodiment, a specific processing procedure of the present disclosure is as follows:

In step S31, spectral analysis (band reflectance, brightness, and temperature) is performed on data of a plurality of channels of the FY-4 satellite, and analysis results are compared to obtain data of channels suitable for distinguishing the dust from other objects, namely channels 1, 2, 3, 5, 6, 11, 12, and 13.

In step S32, dust and non-dust regions are manually marked on image data that is of the FY-4 satellite and collected from different channels, ½ of the marked dust image data is randomly selected and a cloud image is manually added to cover central and edge dust regions in the image. The image data is denoted as cover data, and corresponding raw data is denoted as source data.

In step S4, the dust identification model is constructed, where the dust identification model includes a backbone network, an output network, and a fusion network.

In the step S4, the backbone network has a U-net architecture; and the U-net outputs a confidence coefficient of a dust category to which each pixel belongs.

The output network adopts an eXtreme Gradient Boosting (XGboost) tree; and the XGboost tree outputs a confidence coefficient indicating that a corresponding grid point of a to-be identified region is a dust region.

The fusion network adopts a Bayesian method to fuse an output of the U-net and an output of the XGboost tree to obtain a final result.

In one embodiment, a process of constructing the dust identification model is as follows:

In step S41, the image data marked in the step S32 is divided into grid point data as an input of the U-net for constructing the U-net. In the U-net, a backbone feature extraction network has five convolutional layers and five pooling layers, and an enhanced feature extraction network has an upsampling and stacking structure that matches the convolutional and pooling layers in the backbone feature extraction network. Finally, the U-net outputs a confidence coefficient of each pixel being a dust category.

In step S42, CLDAS data from the China Meteorological Administration, ERA5 data from the European Centre for Medium-Range Weather Forecasts, observation data of a ground station, DDI data, and inversion data of the MODIS within a grid point corresponding to a to-be-identified region in the satellite image input in the step S41 are used as an input of the XGboost tree. Finally, the XGboost tree outputs a confidence coefficient indicating that the corresponding grid point of the to-be identified region is a dust region.

In step S43, feature fusion is performed on the output result of the U-net and the output result of the XGboost tree by using a Bayesian method based on backend fusion.

In step S5, the dust identification model is trained based on the training set to obtain a final model.

In the step S5, an Adam optimization algorithm is used to optimize model parameters during the training of the dust identification model.

As an embodiment, the step S5 in the present disclosure is specifically as follows:

In step S51, labeled training data is split into a training set and a test set based on a ratio of 8:2, parameters of a classification model are optimized and trained by using the training set, and performance of a trained classification model is evaluated by using the test set, where an evaluation index is measured by using an F1 index commonly used for a classification task in machine learning.

In step S52, the Adam optimization algorithm is selected, a learning rate is set to 1e−3 and Beta1 to 0.9 to train the identification model, and a model with best performance on the test set is finally selected as the final identification model.

In step S6, dust identification is completed based on the final model.

As an embodiment, the step S6 is specifically as follows:

In step S61, the inversion data of the MODIS, the data of the ground meteorological observation station, the CLDAS data from the China Meteorological Administration, the ERA5 data from the European Centre for Medium-Range Weather Forecasts, and the data of the AGRI of the FY-4 satellite in the to-be-identified region are collected.

In step S62: After a second part of preprocessing in the method, the data of the to-be-identified region is processed based on a data format supported by the identification model.

In step S63, the data is input into a well-trained identification model, such that the identification model performs inference to obtain an identification result.

In step S64, the identification result of the model is visualized on a map to ultimately identify dust weather automatically based on an identification model of the multimodal neural network.

Figure 2:
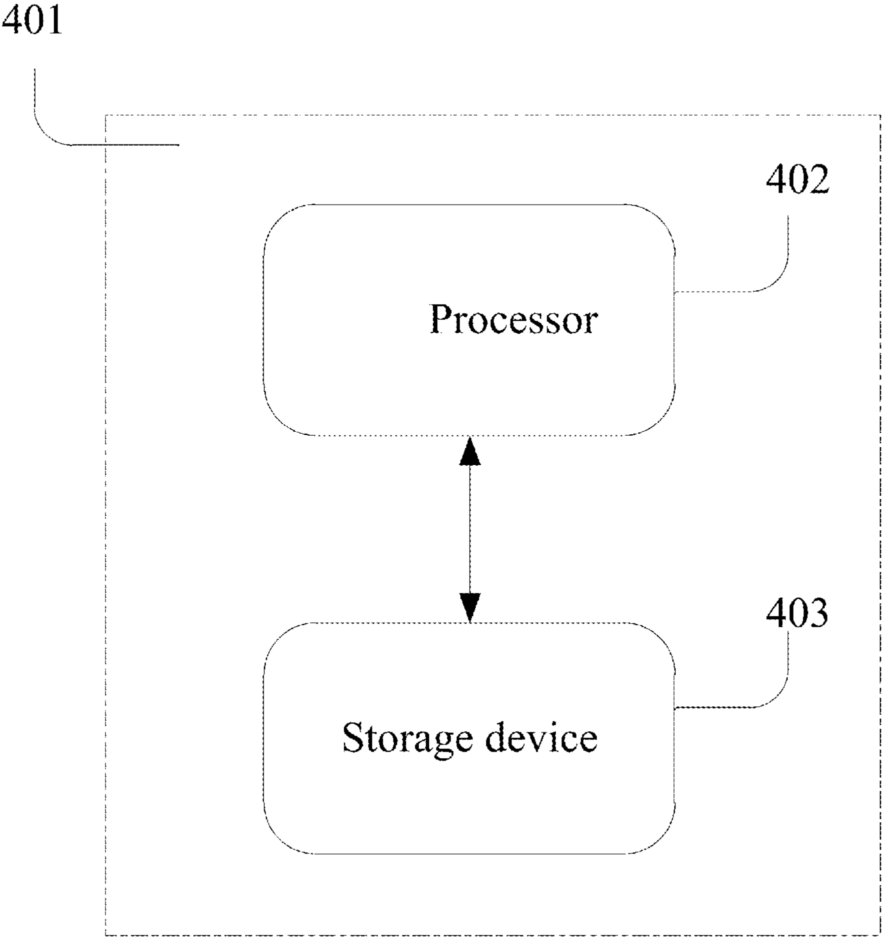
FIG. 2 is a schematic diagram of working of a hardware device according to an embodiment of the present disclosure.

FIG. 2 is a schematic diagram of working of a hardware device according to an embodiment of the present disclosure. The hardware device specifically includes a dust identification device 401 based on a multimodal neural network, a processor 402, and a storage device 403.

The dust identification device 401 based on the multimodal neural network implements the dust identification method based on a multimodal neural network.

The processor 402 loads and executes an instruction and data in the storage device 403 to implement the dust identification method based on a multimodal neural network.

The storage device 403 stores the instruction and data, and is configured to implement the dust identification method based on a multimodal neural network.

The present disclosure has following beneficial effects: In terms of single data utilization of an existing traditional method, the present disclosure integrates multi-source observation data and effectively extracts features of data from different sources by using a deep neural network. Compared with the existing traditional method, the present disclosure has a significant improvement in an identification speed and identification accuracy, as well as a partial improvement in continuity of the dust identification. In the past, identification methods of a convolutional neural network based on machine learning mostly focus on image-level classification. However, the U-net neural network used in the present disclosure focuses on pixel-level classification and has better performance in handling dust regions covered by clouds.

The above are merely preferred embodiments of the present disclosure, and are not intended to limit the present disclosure. Any modifications, equivalent replacements, improvements, and the like made within the spirit and principle of the present disclosure shall be all included in the protection scope of the present disclosure.

What is claimed is:

1. A method for dust identification utilizing a multimodal neural network, comprising following steps:

S1: collecting multi-source data related to dust;

S2: preprocessing the multi-source data to obtain processed data;

S3: constructing a training set for a dust identification model using the processed data;

S4: constructing the dust identification model, wherein the dust identification model comprises a backbone network, an output network, and a fusion network;

S5: training the dust identification model based on the training set to obtain a final model; and S6: identifying dust based on the final model;

wherein in the step S4, the backbone network has a U-net architecture; and the U-net outputs a confidence coefficient of a dust category to which each pixel belongs;

wherein the output network adopts an extreme Gradient Boosting (XGboost) tree; and the XGboost tree outputs a confidence coefficient indicating that a corresponding grid point of a to-be identified region is a dust region.

2. The method according to claim 1, wherein the multi-source data comprises: inversion data of an imaging spectrometer, data of a ground meteorological observation station, and image data of a dust event.

3. The method according to claim 1, wherein the preprocessing in the step S2 specifically comprises: fusing the multi-source data to obtain fused data; and combining a normalized difference dust index and a thermal infrared dust index of the image data of the dust event to obtain a comprehensive dust distinguish index.

4. The method according to claim 1, wherein in the step S3, a process of constructing the training set of the dust identification model is as follows:

performing spectral analysis on a corresponding channel of the image data of the dust event to obtain a channel suitable for distinguishing dust; and in the channel suitable for distinguishing the dust, manually marking corresponding image data of the dust event, distinguishing between a dust region and a non-dust region, and completing construction of the training set.

5. The method according to claim 1, wherein the fusion network adopts a Bayesian method to fuse an output of the U-net and an output of the XGboost tree to obtain a final result.

6. The method according to claim 1, wherein in the step S5, an Adam optimization algorithm is used to optimize model parameters during the training of the dust identification model.

7. A storage device, wherein the storage device stores an instruction and data for implementing the method according to claim 1.

8. A dust identification device based on a multimodal neural network, comprising a processor and a storage device, wherein the processor loads and executes an instruction and data in the storage device to implement the method according to claim 1.

* * * * *